United States Patent
Brown et al.

(10) Patent No.: US 8,035,514 B2
(45) Date of Patent: Oct. 11, 2011

(54) METHOD TO IMPROVE WHITE LIGHT IMMUNITY OF INFRARED MOTION DETECTORS

(75) Inventors: Joe Patrick Brown, North Highlands, NY (US); Armin Duft, Albstadt (DE); Tobias Koenig, Balingen (DE)

(73) Assignee: Honeywell International Inc., Morristown, NJ (US)

( * ) Notice: Subject to any disclaimer, the term of this patent is extended or adjusted under 35 U.S.C. 154(b) by 371 days.

(21) Appl. No.: 12/331,845

(22) Filed: Dec. 10, 2008

(65) Prior Publication Data

US 2010/0141444 A1    Jun. 10, 2010

(51) Int. Cl.
  *G08B 13/18*  (2006.01)
  *G08B 19/00*  (2006.01)
(52) U.S. Cl. .................. 340/555; 340/556; 340/522
(58) Field of Classification Search .............. 340/500, 340/501, 517, 521, 522, 526, 527, 555, 556, 340/557; 250/221, 338.3, 342; 374/124
  See application file for complete search history.

(56) References Cited

U.S. PATENT DOCUMENTS

| | | | |
|---|---|---|---|
| 4,902,887 A * | 2/1990 | Everett, Jr. ............... | 250/221 |
| 5,133,605 A * | 7/1992 | Nakamura .................. | 374/124 |
| 6,188,318 B1 * | 2/2001 | Katz et al. ................. | 340/545.3 |
| 6,246,321 B1 * | 6/2001 | Rechsteiner et al. ........ | 340/522 |
| 6,486,778 B2 * | 11/2002 | Mahler et al. ............... | 340/567 |
| 7,105,800 B1 * | 9/2006 | Staerzl ....................... | 250/221 |
| 7,161,152 B2 * | 1/2007 | DiPoala ...................... | 250/342 |
| 7,679,509 B2 * | 3/2010 | Royer ......................... | 340/567 |

* cited by examiner

*Primary Examiner* — Van T. Trieu
(74) *Attorney, Agent, or Firm* — Husch Blackwell

(57) ABSTRACT

A system and method for improved white light immunity for IR motion sensors. The system comprises a first sensor responsive to light in a first range of wavelengths in the secure area, the first sensor generating a first output signal indicative of a first detected parameter of the light in the first range of wavelengths, a second sensor proximate to the first sensor, the second sensor being responsive to light in a second range of wavelengths in the secure area, and a logic unit for compensating the first output signal based in part upon a reference signal indicative of a second parameter of the light in the second range of wavelengths. The first sensor is a pyro-electric sensor and the second sensor is a visible light sensor. The second parameter comprises an intensity value of the light in the second range of wavelengths, wherein the reference signal is indicative of a differentiation of said intensity value with respect to time. The system further comprises an alarm generation unit to generate an alarm if the first signal exceeds a first threshold value, the first threshold value being a function of a baseline of the first signal.

20 Claims, 6 Drawing Sheets

METHOD TO IMPROVE WHITE LIGHT IMMUNITY OF INFRARED MOTION DETECTORS

BACKGROUND OF THE INVENTION

1. Field of the Invention

The present invention relates to sensors and security systems. More particularly, the present invention relates to providing immunity to bright white light for Passive Infrared (PIR) motion sensors.

2. Related Art

PIR sensors are increasingly being used in numerous security and building automation systems. Automatic light switches, motion detectors, or remote control of electrical appliances are among these uses. PIR motion sensors can detect the infrared light emanating from an intruder, such as a human or motor vehicle, and transmit a signal across the security system. This signal can also be used to trigger an alarm.

PIR motion sensors detect motion based on the infrared (IR) energy emitted by known temperature ranges of the objects that need to be detected, for instance, a human body. The human body generates radiation in the wavelengths of 7 μm to 14 μm generally. To detect the human body, the motion sensor is equipped with a light filter that passes the desired wavelengths of 7-14 μm while reflecting and/or absorbing the rest. The energy that is absorbed by the filter causes heating of the filter. This heat is reradiated and is detected by a plurality of pyroelectric sensing elements within the sensor.

A pyroelectric sensing element responds to incoming radiation by generating an electrical signal that is amplified and processed. The signal represents the temperature of the object relative to a background temperature. The signal generally has two major components that are considered when being processed: a baseline, and a signal threshold (see prior art FIG. 1). When a heat source, such as a human body, moves in front of the sensor, it will cause the signal to vary away from the baseline. If the signal is sufficient to cross the threshold, an alarm may be triggered.

One problem with PIR sensors is that visible light can trigger the pyroelectric element of the sensor. PIR sensors generally have an inherent vulnerability to bright white light, for instance car headlights or bright flashlights. Specifically, when a bright white light is shined on the pyroelectric element, it introduces a signal in this element that, when amplified, will seem to be a legitimate target to the processing component of the sensor. Prior art FIG. 1 illustrates the response of a pyroelectric sensor when bright white light reaches the sensor, such as car headlights shined through a window. The upper graph 10 illustrates a step change of the intensity of the light reaching the sensor and the lower graph illustrates a pyroelectric response signal 20 from the pyroelectric sensor, as well as an upper threshold 22 and a lower threshold 24. As shown, a pyroelectric signal deviating from baseline 26 due to the bright white light exceeds the upper threshold 22 and an alarm is issued.

Thus, a bright light can push the PIR signal over the threshold and trigger an alarm. These false alarms are problematic and reduce the reliability of the sensors. Further, this inherent vulnerability provides a means for a malicious person to force a motion detector into alarm from outside a building by shining a bright light in the direction of the sensor.

Traditional approaches to solving this issue include augmenting the ability of the pyroelectric detector window/filter to block unwanted wavelengths. Pigmentation such as Zinc Sulfide added to the lens blocks white light while passing infrared energy. Alternatively, secondary optical filters can be added. Both approaches have their drawbacks and neither approach satisfies the desire for significantly improved, if not unlimited white light immunity.

Another method involves temporarily increasing the alarm threshold to desensitize the unit in the presence of a bright white light. A secondary light sensor is utilized to detect when lighting conditions change. If the change in light intensity exceeds a predetermined threshold for this light sensor, any potential alarm signal is suppressed for a predetermined time period of this change. This will prevent false alarms when a light is shined on the motion detector. However, this also drastically decreases the sensitivity of the sensor, making it prone to spoofing, i.e. a person using a bright light to desensitize the motion detector, and walking through the detection zone undetected.

Accordingly, it would be advantageous to provide a motion detecting method and system that provides significantly improved white light immunity while obviating intentional blinding of the sensor by an intruder.

SUMMARY OF THE INVENTION

In view of the foregoing and other problems, the present invention provides improved white light immunity for IR motion sensors. In one exemplary embodiment, the present invention is a system for detecting the presence of a moving object within a detection area, comprising a first sensor responsive to light in a first range of wavelengths in the secure area, the first sensor generating a first output signal indicative of a first detected parameter of the light in the first range of wavelengths, a second sensor proximate to the first sensor, the second sensor being responsive to light in a second range of wavelengths in the secure area, and a logic unit for compensating the first output signal based in part upon a reference signal indicative of a second parameter of the light in the second range of wavelengths. The first sensor is a pyroelectric sensor and the second sensor is a visible light sensor. The first range of wavelengths thus comprises wavelengths in the infrared spectrum and the second range of wavelengths comprises wavelengths in the visible and near infrared spectrum. The system further comprises an alarm generation unit to generate an alarm if the first signal exceeds a first threshold value, the first threshold value being a function of a baseline of the first signal.

The second parameter comprises an intensity value of the light in the second range of wavelengths, and the reference signal is indicative of a differentiation of said intensity value with respect to time. The logic unit may compensate the first signal by adjusting the baseline of the first signal at a rate corresponding to the differentiation of the intensity value. Alternatively, the logic unit compensates the first signal by adjusting an amplitude of the first signal at a rate corresponding to the differentiation of the intensity value. This can be done by subtracting the reference signal from the first signal.

The reference signal is a second signal indicative of the second parameter of the light in the second range of wavelengths and may be detected by the second sensor. Alternatively, the second signal is a preprogrammed reference signal stored on a memory coupled to the logic unit.

In another embodiment, the present invention is a method for detecting the presence of a moving object within a secure area, comprising generating at a first sensor a first output signal indicative of a first detected parameter of light in a first range of wavelengths, and compensating the first output signal based in part upon a reference signal indicative of a second parameter of light in a second range of wavelengths. The method further comprises generating an alarm if the first signal exceeds a first threshold value, the first threshold value being a function of a baseline of the first signal. The second parameter comprises an intensity value of the light in the second range of wavelengths, wherein the reference signal is indicative of a differentiation of said intensity value with respect to time.

The method may further comprise adjusting a baseline of the first signal at a rate corresponding to the differentiation of the intensity value. Alternatively, the method further comprises adjusting an amplitude of the first output signal at a rate corresponding to the differentiation of the intensity value.

The reference signal is a second output signal indicative of the second parameter of the light in the second range of wavelengths, and may be generated by a second sensor responsive to the light in the second range of wavelengths. Alternatively, a preprogrammed reference signal is stored on a memory coupled to the logic unit, and used as the reference signal.

The reference signal and thus the compensation of the first signal, is unrelated to the signals generated by moving objects because the frequency of these signals is different. The compensation is selective to white light, and thus the detector remains sensitive to motion.

Although a motion detection system and method will be described in connection with a security system, it should be recognized that the application of the system and method according to the present invention is not limited to a security system. Rather, the system and method is applicable to any other suitable circumstances, such as electrical appliances control, where detection of a moving object in a detection zone is required.

DETAILED DESCRIPTION

The present invention now will be described in detail hereinafter with reference to the accompanying drawings, in which preferred embodiments of the invention are shown. However, this invention may be embodied in many different forms and should not be construed as limited to the embodiments set forth herein. Like numerals refer to like elements throughout.

Figure 2:
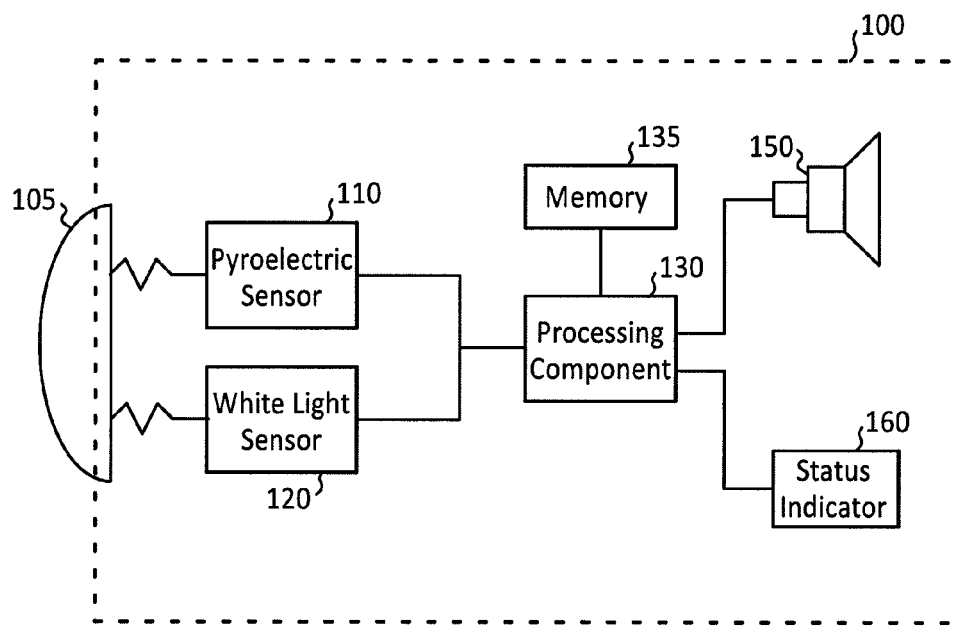
FIG. 2 is a block diagram of a motion detection system, according to an exemplary embodiment of the present invention.

FIG. 2 illustrates a block diagram of a motion detection system 100 according to one exemplary embodiment of the present invention. Generally, the motion detection system 100 includes an optical element 105, such as a lens or mirror, a pyroelectric sensor 110, a white light sensor 120, a processing component 130, a memory 135, a signal amplifier (not shown), an alarm output or relay 150 and a status indicator 160.

The optical element 105, for example, a Fresnel lens array or mirror array, is disposed near the pyroelectric sensor 110 and the white light sensor 120 to focus and transmit the incoming radiation (IR and visible) onto the sensors. For example, a Fresnel lens array can be molded and mounted externally in the housing (not shown) of the motion detection system 100 to implement the lens 105. The lens 105 can inhibit the passage of light having predetermined wavelengths, and thereby can function as a filtering element. The lens 105 can be multi-faceted in order to provide a plurality of detection zones, which can be fanned out in a vertical orientation as well as horizontal orientation to maximize the coverage of the motion detection system 100.

The pyroelectric sensor 110 is responsive to infrared light radiating from objects in a secure area. The pyroelectric sensor 110 converts the infrared light into electrical signals. For example, the pyroelectric sensor 110 generates a first output signal, or pyroelectric signal, indicative of the change of the level of infrared light in the secure area and sends the signal to the processing component 130. If the level of the infrared light in a certain secure area suddenly increases causing the electrical signal to increase beyond a threshold level, it is determined that an intruder is present in the detection zone, and subsequently an alarm is issued via the alarm output 150.

The energy sensing elements in a pyroelectric sensor 110 are sensitive to all wavelengths of light from the UV to the IR including the visible wavelengths. The pyroelectric sensor 110 is equipped with a filter to block, as much as possible, light outside a desired range of wavelengths. For example, the pyroelectric sensor 110 can be configured to be sensitive to ER radiation having a wavelength approximately between 7 μm-14 μm. This is typically achieved by integrating a light filter that passes energy between 7 μm and 14 μm while blocking the remainder.

White light sensor 120 is disposed proximate to the pyroelectric sensor 110 and is capable of monitoring visible light reaching both the pyroelectric sensor 110 and the white light sensor 120 passing through the lens 105. For example, the white light sensor 120 is provided in the same cavity within the housing as the pyroelectric sensor 110, to ensure that light intensity reaching pyroelectric sensor 110 is the same as that reaching white light sensor 120. White light sensor 120 can be any suitable known sensor responsive to light in the visible spectrum. White light sensor 120 may also be responsive to light in the near-IR spectrum. For example, white light sensor 120 can be a photodiode, phototransistor, photovoltaic cell or other suitable device.

As described below in the operation of processing component 130, white light sensor 120 is provided to detect the emission of a potentially false alarm triggering light source, for example, a flashlight or automobile headlights, by monitoring only visible light or both visible light and near infrared light. Typically, visible light is light having a wavelength of between approximately 380 and 750 nm. The output signal from white light sensor 120 is transmitted to the processing component 130, optionally via amplifier 125, for processing the pyroelectric signal from pyroelectric sensor 110.

The second output signal may have to exceed a white light threshold value before the compensation process is triggered. In one embodiment, processing unit 130 receives and constantly averages the ambient white light over a period of time detected by white light sensor 120. A white light threshold value may be added to this average ambient value, and exceeding of this white light threshold will trigger the compensation mechanism.

The processing component 130 compensates the pyroelectric signal based on the second output signal from white light sensor 120. Alternative compensation processes are described in FIGS. 3 and 7. The general process is that because the white light will cause the pyroelectric signal to shift, at a rate nearly proportional to the intensity of light shined on the sensor, the pyroelectric signal is compensated at the same rate, so as to reduce false alarms due to light intensity changes. This compensation uses a scale factor or differentiation of the intensity of the signal detected by white light sensor 120. White light sensor 120 senses visible light and generates a second output signal indicative of a detected parameter of the visible light reaching the pyroelectric sensor 110. The detected parameter may be the change or differentiation of the light intensity of the visible light reaching system 100 within a predetermined time span. Alternatively, the detected parameter is a real-time light intensity of the visible light and other parameters according to different time sequences are fed to the processing component 130 to obtain the change or differentiation of the light intensity.

In one exemplary embodiment, the differentiation may represent a scale, for instance a number between zero and one, depending on the type of amplifier chain used on the motion detector. Some amplifiers amplify some frequencies much better than others, which means there will be minor adjustments to make the white light immunity perform optimally on different types of amplifiers. The scale may be referred to as the white light scale, WL-scale. Processing unit 130 compensates the PIR signal to reflect this scale. The compensated output signal is the PIR signal used to determine whether or not to issue an alarm. Since the scale represents a rate of change is proportional to the change in light intensity, a person walking in the sensors field of view will not walk at a speed that will produce a PIR signal at the same frequency or phase of that caused by the light. Therefore an intruder walking in front of the sensor while white light is present will still force the sensor to cross the thresholds and cause an alarm. Overall, the sensor will have excellent white light immunity and sacrifice little or no sensitivity loss.

In addition, if it is determined that the compensated signal from the pyroelectric sensor 110 exceeds a threshold value, the processing component 130 generates an activating signal and further transmits the signal to alarm output 150. Upon receiving an activating signal, the alarm output 150 changes from the normal state to the alarm state. An alarm relay is correspondingly changed from the closed state to the open state. An alarm panel (not shown) of the motion detection system detects this condition and takes measures, such as sounding an alarm, turning on one or more lights and/or notifying the police, for example.

It should be recognized that the processing component can be any computer-related entity as long as it is capable of executing the functionality thereof. For example, the component includes but not limited to hardware, software in the form of a logic unit stored on a memory on said hardware, or any equivalent combination of hardware and software logic.

Figure 3:
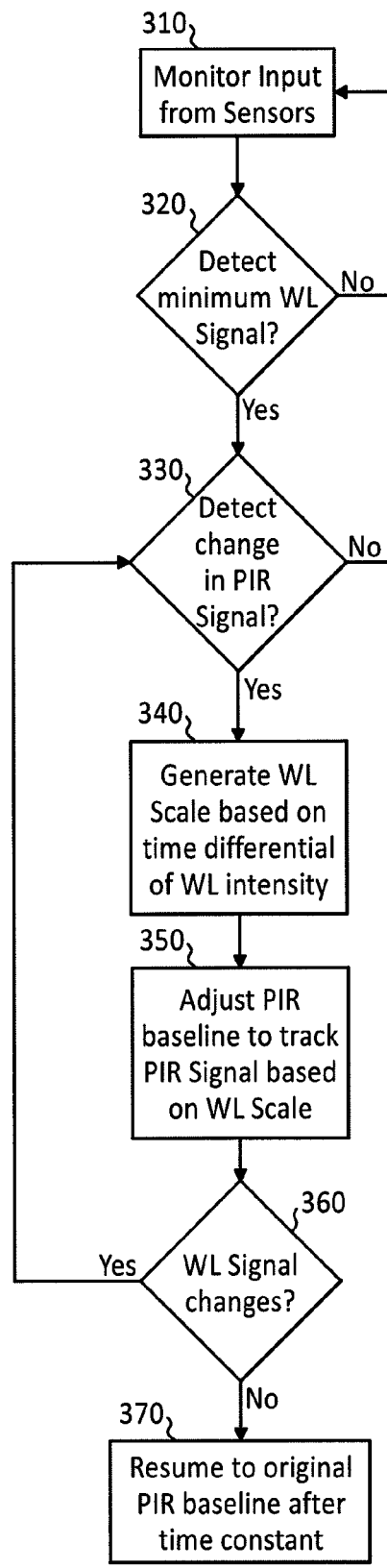
FIG. 3 shows a method for compensating a PIR signal affected by white light, according to an exemplary embodiment of the present invention.

In one exemplary embodiment, based on the WL-scale, the pyroelectric signal may be compensated by changing the baseline of the pyroelectric signal. Since the threshold to trigger an alarm is a function of the baseline, i.e. threshold=baseline+/−value, changing the baseline would correspondingly modify the positive and negative thresholds. FIG. 3 shows the process steps to adjust the baseline based on the WL-scale, according to an exemplary embodiment of the present invention. Although the steps of the embodiment are shown and described as a series of acts, it should be recognized that the present invention is not limited by the order of acts, as some acts may occur in different orders and/or concurrent with other acts. Moreover, not all illustrated acts are required to implement the embodiment of the method according to the present invention.

Referring to FIG. 3, a motion detection system, such as the system 100, monitors signals from PIR and WL sensors constantly (310). When a WL signal from WL sensor 120 crosses a predetermined minimum threshold (320), the PIR signal is monitored for any changes (330). If both signals reflect a change, the compensation process begins.

Alternatively, as described above, processing unit 130 receives and constantly averages the ambient white light over a period of time detected by white light sensor 120. A white light threshold value may be added to this average ambient value, and exceeding of this white light threshold will trigger the compensation process.

A scaling factor is generated (340) by processing component 130 as described above. The baseline of the PIR signal is adjusted (350) to reflect the change in intensity of the bright white light as indicated by the sealing factor. This allows the PIR signal baseline to track any potential changes induced by the white light detected by the PIR sensor 110. In one exemplary embodiment, a software-based low-pass filter may be implemented within processing component 130 to shift the PIR baseline to track the response of the PIR signal to the white light. This can be done by using the formula:

$$PIR\_baseline = PIR\_baseline\_last + (WL\_scale \times PIR\_data) - (WL\_scale \times PIR\_baseline\_last)$$

PIR_baseline is the baseline for comparison to the threshold, wherein an alarm is generated if the PIR_data signal is greater than the PIR_threshold value away from the PIR_baseline. Given a time constant (WL_scale) proportional to the change in white light intensity, the PIR baseline will approximately track the PIR signal. Since the PIR thresholds are a given value plus and minus the baseline, if the PIR baseline does track the PIR when there is change in light intensity there will be no alarms due to the light.

Another factor in white light immunity is the amount of time the baseline will track the PIR signal. Given a constant light input to the PIR (360), the signal will have an initial response and then settle back down to the original baseline. This response is another factor determined by the type of amplifier, and will usually be between two and seven seconds. Specifically, when the change in energy occurs on the pyroelectric sensing elements, the pyroelectric signal will depart from its baseline value. When the energy change stabilizes or is removed, it may take from 2 to 7 seconds for the pyroelectric signal to return to the baseline value depending on amplifier circuit design, the pyroelectric design and light intensity.

Thus, the PIR baseline temporarily follows the PIR signal at a rate proportional to the change in the intensity of light. Once the baseline has tracked the PIR signal for a set amount of time, it will return to the original baseline at the same rate. The scaled number will be the rate at which the PIR baseline will approach the actual PIR signal. A counter may be used to make the baseline track the PIR signal when there is a change in light, and once the light has been on for a while the baseline will track back to the original baseline.

Figure 1:
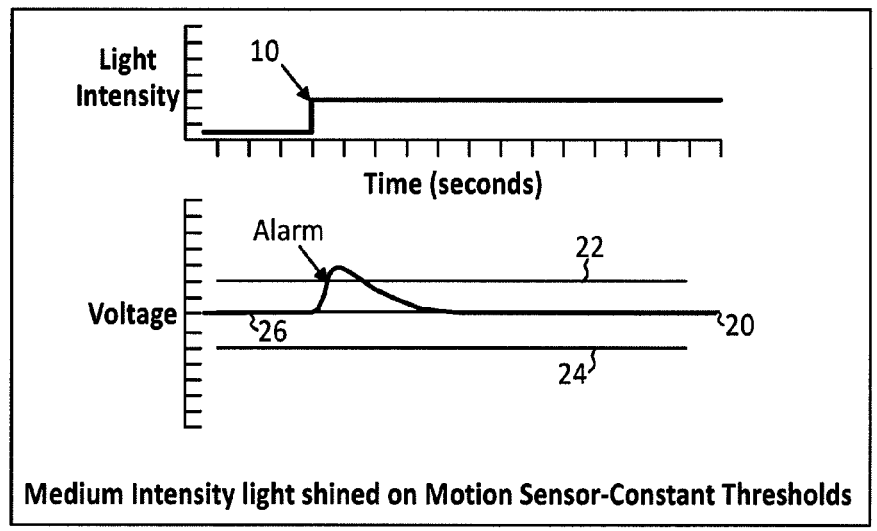
FIG. 1 illustrates PIR sensor response to white light, according to the prior art.
Figure 4A:
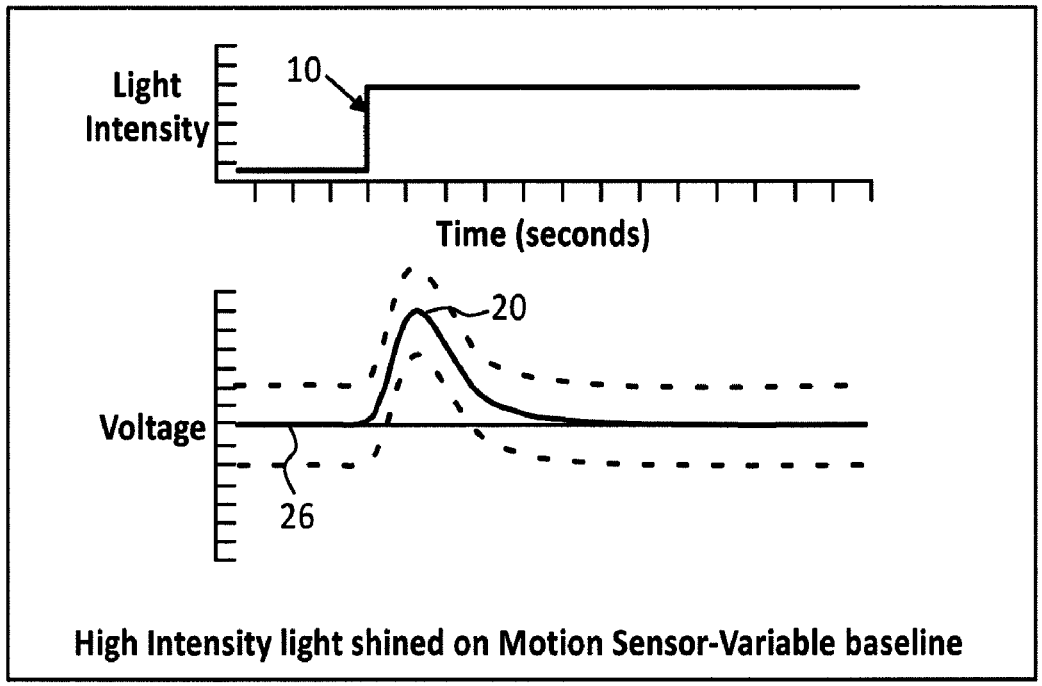
FIGS. 4A-4D illustrate PIR sensor responses to white light, according to an exemplary embodiment of the present invention.

FIGS. 4A-4D show response curves for the above method, according to an exemplary embodiment of the present invention. Similar to prior art FIG. 1, FIG. 4A shows the response of a pyroelectric sensor to the instant presence of a bright white light, according to an exemplary embodiment of the present invention. The white light (WL) signal 10 in the upper graph shows a step increase sufficient to trigger the compensation mechanism. PIR signal 20 reflects this increase in white light. However, an alarm is not triggered because the baseline 26 is being shifted at a rate proportional to the step increase. Since upper and lower thresholds 22 and 24 are a function of the baseline 26, the thresholds move with the PIR signal, and are therefore not crossed. After a predetermined period, the PIR signal returns to the baseline 26 without triggering an alarm, for instance when an increase in light intensity is detected the counter begins counting up to a maximum value. While the counter is below this value, the baseline is free to track the PIR signal. Once the counter reaches its maximum value, the baseline will begin returning to its original value. Since both thresholds are not increased the the sensor is not desensitized.

Figure 4B:
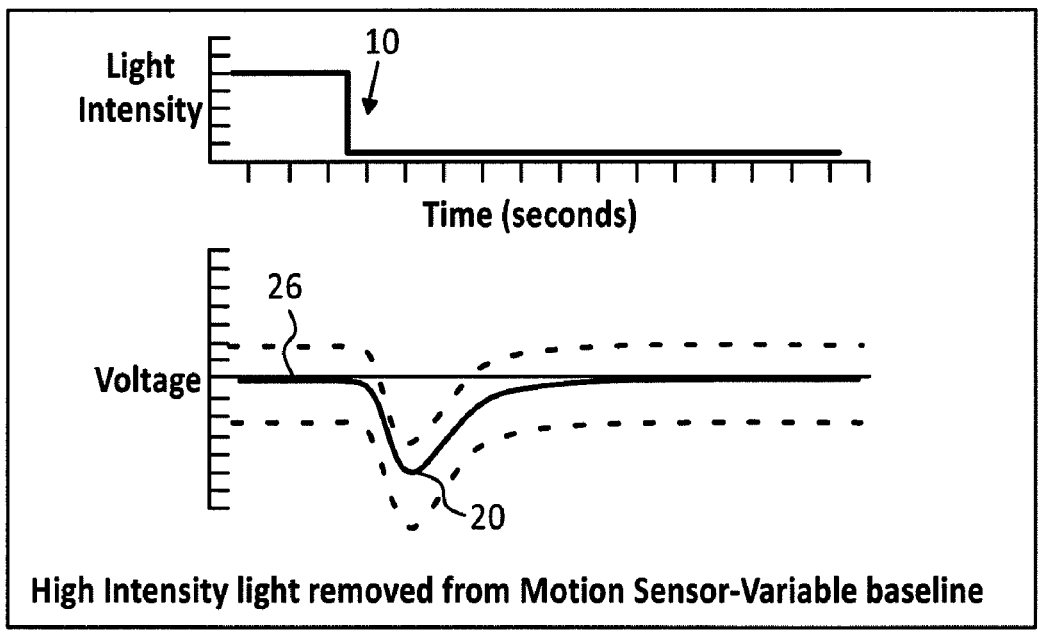

FIG. 4B shows a similar response to a negative change, or step down in bright white light, as represented by WL signal 10. PIR signal 20 drops at a rate proportional to the change in intensity of white light, and the baseline correspondingly drops, based upon the WL signal detected by WL sensor 120. Both thresholds correspondingly follow the signal, and no alarm is issued.

Figure 4C:
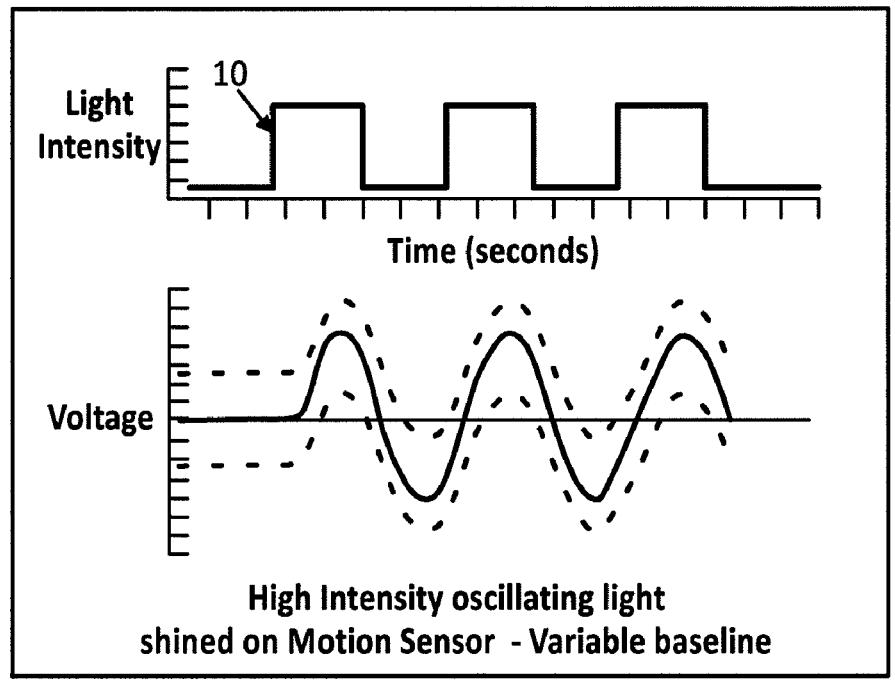

FIG. 4C shows a robust response to an oscillating white light source. Changes in the white light are tracked by the baseline, as per adjustments made by processing unit 130. When the light is removed, the counter is at its maximum value and will begin counting down to zero. While the counter is greater than zero, the baseline is free to track the PIR signal. In other words, if the light was just turned on, the baseline tracks PIR signal proportional to amount of light, and if the light has been on for a long time, the baseline returns to original baseline value at a rate proportional to amount of light. If the light was just turned off, the baseline tracks the PIR signal proportional to the amount of light there used to be, and if the light has been off for a long time, the baseline returns to original baseline value at a rate proportional to the amount of light there used to be. Once the counter reaches zero the baseline will begin returning to its original value, and no threshold is triggered.

Figure 4D:
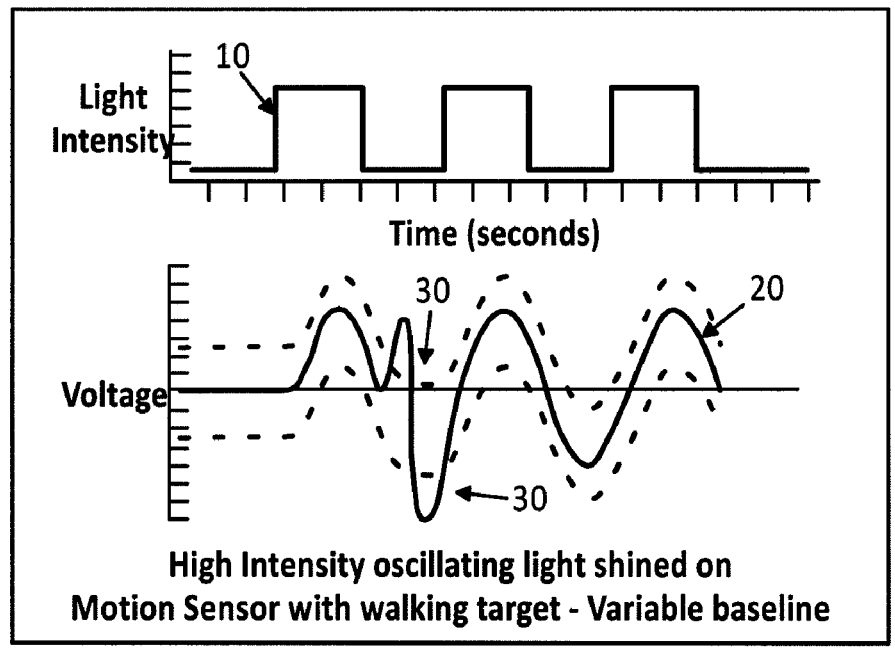

FIG. 4D shows the oscillating light source of FIG. 4C, except when used by an intruder to spoof the motion detection system. Since the rate is proportional to change in light intensity generally a person walking in the PIR sensors field of view will not walk at a speed that will produce a PIR signal at the same frequency or phase of that caused by the light. Therefore an intruder walking in front of the sensors while white light is present will still force the PIR signal to cross the thresholds and cause an alarm. Overall, the motion detection system will have excellent white light immunity and sacrifice little or no sensitivity loss.

As described herein, instead of changing the PIR baseline, the PIR signal itself may be compensated based on the WL scale. For instance, the amplitude of the PIR signal may be reduced or increased in proportion to the rate of change of white light, to compensate for any response the PIR signal may have towards the white light. Furthermore, the white light (WL) signal 10 is not necessarily used to generate the reference signal. Instead, a reference signal indicative of a PIR response to a standard white-light pulse may be stored on a memory 135 within the motion detection system 100, and may be used to compensate the PIR signal when the WL sensor detects white light.

Alternatively, one or more reference signals may be pre-recorded, and the WL signal 10 can be used to generate a WL scale, wherein each of the reference signals corresponds to varying threshold levels of the WL scale. Thus, when white light triggers the compensation mechanism as described above, a corresponding reference signal may be, for instance, subtracted from the PIR signal, such that the PIR signal does not trigger an alarm. In such a case the threshold values designed to trigger an alarm would not be changed, only the PIR signal would be compensated so as not to trigger the thresholds.

In common pyroelectric sensors a polarity of the electrical signal caused by white light is not defined by the manufacturer. To apply the compensation algorithm effectively, it is necessary to either know the polarity, or to eliminate its effect. In one exemplary embodiment, the present invention is extended to include an algorithm with a calculation of the absolute value of the input signals, so that the polarity no longer matters.

Figure 5:
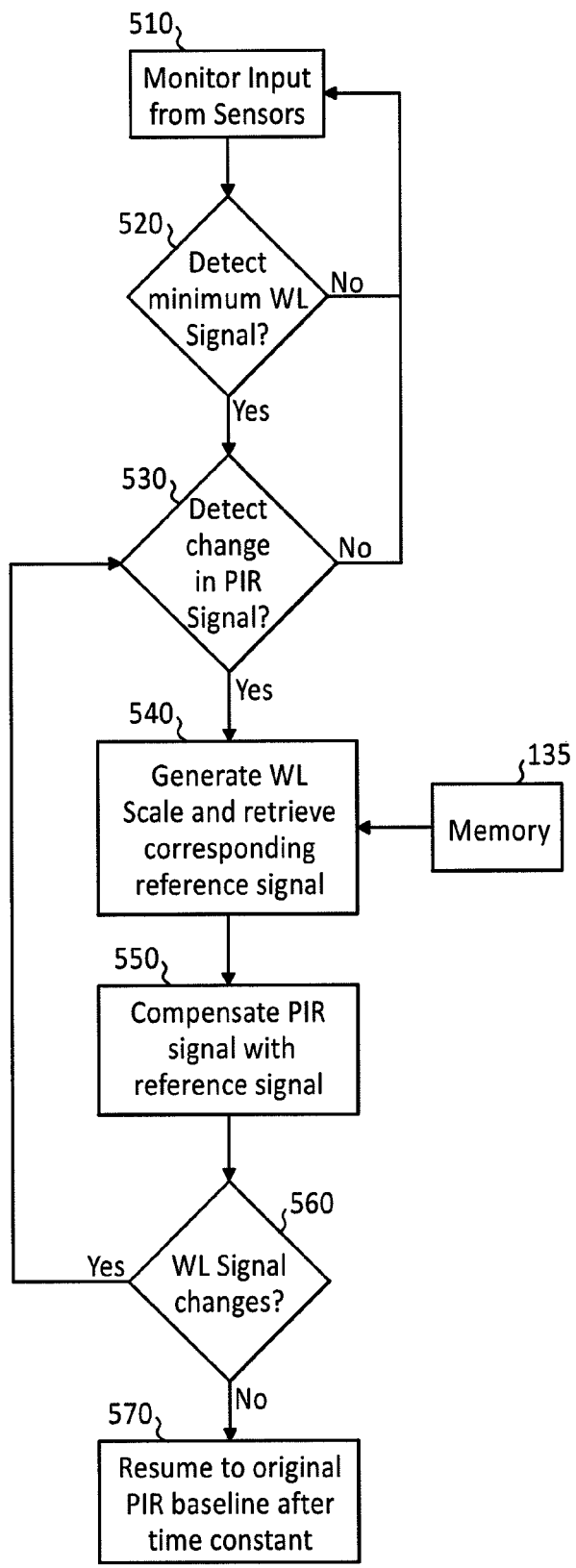
FIG. 5 shows a second method for compensating a PIR signal, according to an exemplary embodiment of the present invention.

FIG. 5 shows a process of compensating a PIR signal using pre-recorded reference signals, according to an exemplary embodiment of the present invention. Although the steps of the embodiment are shown and described as a series of acts, it should be recognized that the present invention is not limited by the order of acts, as some acts may occur in different orders and/or concurrent with other acts. Moreover, not all illustrated acts are required to implement the embodiment of the method according to the present invention. As in FIG. 3, a motion detection system, such as the system 100, monitors signals from PIR and WL sensors constantly (510). When a WL signal 10 from WL sensor 120 crosses a predetermined minimum threshold (520), the PIR signal is monitored for any changes (530). If both signals reflect a change, the compensation process begins.

A scaling factor is generated (540) by processing component 130 as described above. One or more reference signals may have been pre-recorded under ideal conditions, and stored on memory 135 coupled to processing component 130. The reference signals indicate known PIR sensor responses to white light. Processing component 130 retrieves a reference signal corresponding to the WL scale based on the detected parameter of the white light. The PIR signal is compensated (550) to reflect the change in intensity of the bright white light as indicated by the scaling factor. This may be done by subtracting the reference signal from the PIR signal. This allows the PIR signal to negate any potential changes induced by the white light affecting the pyroelectric sensor 110. The PIR thresholds remain unchanged, and the PIR signal does not exceed the PIR thresholds when there is change in light intensity. Thus there will be no alarms due to the light.

As in the embodiment described in FIG. 3, there is no need to maintain the compensation given a constant light input to the PIR (560). The signal will have an initial response and then settle back down to the original baseline (570).

The present invention also suggests a temporary addition to the PIR threshold when light is present. To help prevent false alarms on motion detectors with very sensitive amplifiers the threshold for the PIR signal is adjusted up slightly when a change in light intensity is detected(usually no more than 100 mV).

Figure 6:
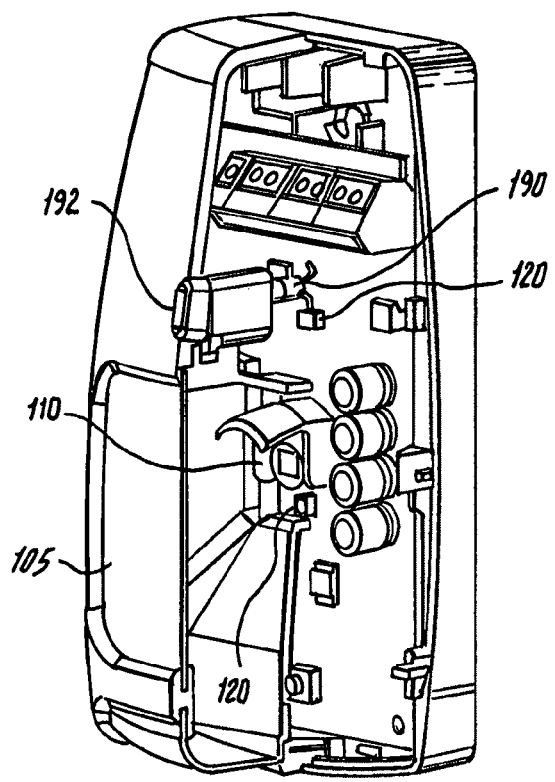
FIG. 6 is a perspective view of a motion detection system, according to an exemplary embodiment of the present invention

FIG. 6 is an exemplary perspective view of the motion detection system 100, illustrating the spatial relationship of the lens 105, the pyroelectric sensor 110 and the white light sensor 120, and possible locations of the white light sensor 120. As shown in the exemplary embodiment, the white light sensor 120 can be disposed very close to the pyroelectric sensor 110. Alternatively, the white light sensor 120 can be disposed under a light pipe 192 of the status indicator 160. Although a detecting system can function properly with a white light sensor positioned under the light pipe 192 of the status indicator 160, the off-axis uniformity of the light reaching the white light sensor 120 may differ from the off-axis uniformity of the light reaching the pyroelectric sensor 110. Thus, in order to ensure that the pyroelectric sensor 110 and the white light sensor 120 are seeing very nearly the same amount of white light, it is preferred to position the white light sensor 120 in very close proximity to the pyroelectric sensor 110. However, according to the present invention, locations of the white light detector 120 are not limited to the above-mentioned locations. A person of ordinary skill in the art should understand that any suitable location of the white light sensor 120 within or on the motion detection system 100 is within the scope of the present invention as long as the motion detection system 100 functions properly.

Figure 7:
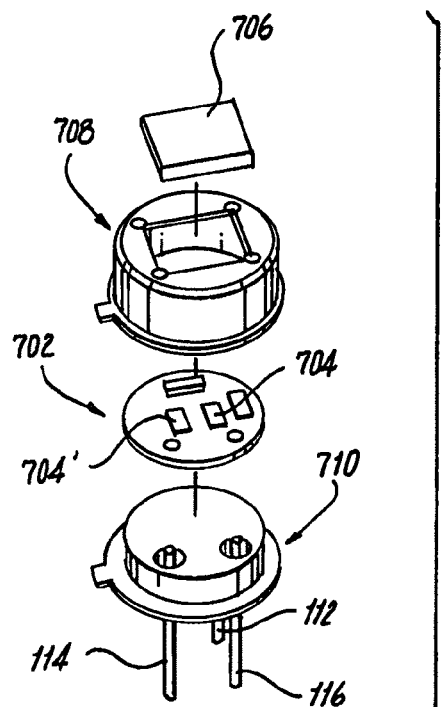
FIG. 7 is an exploded view of a pyroelectric sensor, according to an exemplary embodiment of the present invention.

FIG. 7 shows an exploded view illustrating an exemplary structure of the pyroelectric sensor 110 of the motion detection system 100. An internal printed circuit board 702 contains two pyroelectric sensing elements 704 and 704', one of which is a positive element and the other of which is a negative element. The pyroelectric sensing elements 704, 704' are 2 mm tall by 1 mm wide and spaced by 1 mm. An optical filter 706 is bonded to a housing cover 708. For example, the optical filter 706 passes energy in the wavelength range of 5 to 15 μM and blocks energy below 5 μM.

Filters used on pyroelectric sensing elements 704, 704' are usually made of Silicon which absorbs energy below 1.1 μM. Many thin layers of Germaniun and Zinc Sulfide are placed on the Silicon to increase the blocking range up to 5 μM. When energy absorbed by the filter turns to heat which passes through the optical filter 706 and is detectable by the pyroelectric sensing elements, a false alarm may be issued. When the internal printed circuit board 702 is installed on the housing base 710, the housing cover 708 containing the optical filter 706 is hermetically sealed to the housing base 710. For example, the pyroelectric sensor 110 may contains three leads. One is a ground lead 112, another is a power lead 114 for bringing external power into the pyroelectric sensor 110 and the other lead 116 is to route the pyroelectric signal out of the sensor 110.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A motion detection system for detecting a presence of a moving object within a secure area, the system comprising:
   a first sensor responsive to light in a first range of wavelengths in the secure area, the first sensor generating a first output signal indicative of a first detected parameter of the light in the first range of wavelengths;
   a second sensor proximate to the first sensor, the second sensor being responsive to light in a second range of wavelengths in the secure area;
   a logic unit for compensating the first output signal based in part upon a reference signal indicative of a second parameter of the light in the second range of wavelengths; and
   an alarm generation unit to generate an alarm if the first output signal exceeds a first threshold value, the first threshold value being a function of a baseline of the first output signal,
   wherein the second parameter comprises an intensity value of the light in the second range of wavelengths,
   wherein the reference signal is indicative of a differentiation of said intensity value with respect to time,
   wherein the reference signal is a second signal indicative of the second parameter of the light in the second range of wavelengths detected by the second sensor,
   wherein the logic unit compensates the first output signal only when the second parameter of the light in the second range of wavelengths exceeds a second preprogrammed threshold value, and
   wherein the second preprogrammed threshold value is added to an average value over a predetermined time period of the light in the second range of wavelengths detected by the second sensor over said predetermined time period.

2. The system of claim 1, wherein the logic unit compensates the first output signal by adjusting the baseline of the first output signal at a rate corresponding to the differentiation of the intensity value.

3. The system of claim 2, wherein the logic unit restores the adjusted baseline to the baseline of the first output signal after a predetermined time period.

4. The system of claim 1, wherein the logic unit compensates the first signal by adjusting an amplitude of the first output signal at a rate corresponding to the differentiation of the intensity value.

5. The system of claim 4, wherein the adjustment comprises subtracting the reference signal from the first output signal.

6. The system of claim 4, wherein the adjustment comprises subtracting the reference signal from an absolute value of the first output signal.

7. The system of claim 1, wherein the reference signal is a preprogrammed reference signal stored on a memory coupled to the logic unit.

8. The system of claim 7, further comprising a plurality of preprogrammed reference signals stored on the memory, each of the plurality of preprogrammed reference signals corresponding to a plurality of preprogrammed threshold values.

9. The system of claim 1, wherein the first sensor is a pyroelectric sensor and the second sensor is a visible light sensor.

10. The system of claim 9, wherein the first range of wavelengths comprises wavelengths in the infrared spectrum and the second range of wavelengths comprises wavelengths in the visible spectrum.

11. A method for detecting a presence of a moving object within a secure area, the method comprising:
   generating at a first sensor a first output signal indicative of a first detected parameter of light in a first range of wavelengths;
   compensating the first output signal based in part upon a reference signal indicative of a second parameter of light in a second range of wavelengths;
   generating an alarm if the first output signal exceeds a first threshold value, the first threshold value being a function of a baseline of the first output signal;
   compensating the first output signal only when the second parameter of the light in the second range of wavelengths exceeds a second preprogrammed threshold value; and
   determining an average value over a predetermined time period of the light in the second range of wavelengths detected by the second sensor over said predetermined time period, and adding the second preprogrammed threshold value to said average value,
   wherein the second parameter comprises an intensity value of the light in the second range of wavelengths, and wherein the reference signal is indicative of a differentiation of said intensity value with respect to time, and wherein the reference signal is a second output signal indicative of the second parameter of the light in the second range of wavelengths, the second output signal being generated by a second sensor responsive to the light in the second range of wavelengths.

12. The method of claim 11, further comprising adjusting a baseline of the first output signal at a rate corresponding to the differentiation of the intensity value.

13. The method of claim 12, further comprising restoring the adjusted baseline to the baseline of the first output signal after a predetermined time period.

14. The method of claim 11, further comprising adjusting an amplitude of the first output signal at a rate corresponding to the differentiation of the intensity value.

15. The method of claim 14, further comprising subtracting the reference signal from the first output signal.

16. The method of claim 14, further comprising subtracting the reference signal from an absolute value of the output signal.

17. The method of claim 11, further comprising:
storing a preprogrammed reference signal on a memory coupled to the logic unit; and using the preprogrammed reference signal as the reference signal.

18. The method of claim 17, further comprising storing a plurality of preprogrammed reference signals stored on the memory, each of the plurality of preprogrammed reference signals corresponding to a plurality of preprogrammed threshold values.

19. The method of claim 11, wherein the first sensor is a pyroelectric sensor and the second sensor is a visible light sensor.

20. The method of claim 19, wherein the first range of wavelengths comprises wavelengths in the infrared spectrum and the second range of wavelengths comprises wavelengths in the visible spectrum.

\* \* \* \* \*